United States Patent [19]
Flath

[11] Patent Number: 6,065,072
[45] Date of Patent: May 16, 2000

[54] DEVICE FOR SELECTIVELY PASSING VIDEO FRAMES FROM A SIGNAL SERIES HAVING A FIRST FRAME RATE TO OBTAIN A SIGNAL SERIES HAVING A SECOND FRAME RATE

[75] Inventor: Laurence M. Flath, Royal Oak, Mich.

[73] Assignee: Thermal Wave Imaging, Inc., Lathrup Village, Mich.

[21] Appl. No.: 08/865,578

[22] Filed: May 29, 1997

Related U.S. Application Data

[60] Provisional application No. 60/015,868, May 29, 1996.
[51] Int. Cl.[7] ............................. G06F 13/00; H04N 7/18; H04N 5/33; H04N 5/228
[52] U.S. Cl. .............................. 710/29; 710/62; 710/72; 348/61; 348/64; 348/164; 348/222
[58] Field of Search ..................................... 364/200, 436, 364/926.93, 927.99, 238.3; 710/14, 29, 72, 36, 58, 60, 62; 713/100; 382/1; 345/115, 204; 348/61, 64, 164, 222; 395/849, 892, 856, 878, 880, 882

[56] References Cited

U.S. PATENT DOCUMENTS

| | | | |
|---|---|---|---|
| 4,371,932 | 2/1983 | Dinwiddie et al. | 364/200 |
| 4,496,995 | 1/1985 | Colles et al. | 360/9.1 |
| 5,301,240 | 4/1994 | Stockum et al. | 382/1 |
| 5,416,711 | 5/1995 | Gran et al. | 364/436 |
| 5,465,105 | 11/1995 | Shatas et al. | 345/204 |
| 5,631,701 | 5/1997 | Miyake | 348/222 |
| 5,638,299 | 6/1997 | Miller | 713/100 |
| 5,640,202 | 6/1997 | Kondo et al. | 348/222 |
| 5,675,358 | 10/1997 | Bullock et al. | 345/115 |
| 5,701,514 | 12/1997 | Keener et al. | 710/14 |
| 5,784,099 | 7/1998 | Lippincott | 348/222 |

*Primary Examiner*—Thomas C. Lee
*Assistant Examiner*—Tanh Quang Nguyen
*Attorney, Agent, or Firm*—Rader, Fishman & Grauer PLLC

[57] ABSTRACT

An imaging system which incorporates a gate (which can be implemented either in hardware or software) for gating video signals to a host PC. The present invention allows fixed frame cameras to be used in applications which would otherwise require the host PC to have prohibitively large amounts of random access memory. However, by selecting predetermined frames of video data from a fixed frame output camera, the present invention simulates the effect of a variable frame rate camera.

12 Claims, 2 Drawing Sheets

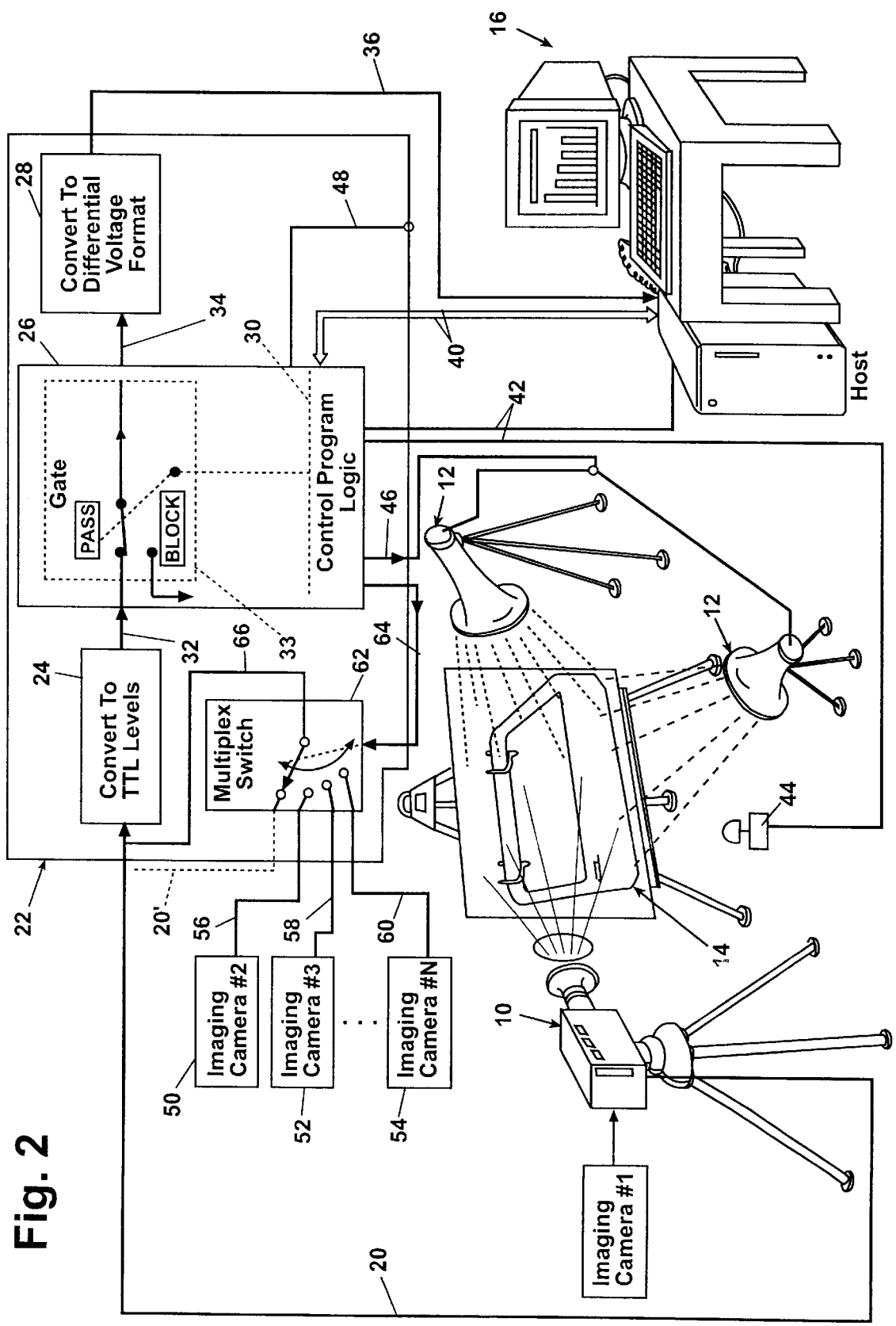

DEVICE FOR SELECTIVELY PASSING VIDEO FRAMES FROM A SIGNAL SERIES HAVING A FIRST FRAME RATE TO OBTAIN A SIGNAL SERIES HAVING A SECOND FRAME RATE

This application claims the benefit of U.S. Provisional Application No. 60/015,868, filed May 29, 1996.

TECHNICAL FIELD

This invention relates to imaging systems and more particularly relates to devices which control the selection and transfer of portions of video data.

BACKGROUND OF THE INVENTION

Video cameras and video systems have found widespread use in many entertainment, security, scientific and engineering applications. For many of these applications, continuous data acquisition at the highest possible frame rate is required. However, for some scientific and engineering applications where the target varies (or an attribute thereof) in time or position, it may be necessary to gate the acquisition of image data to coincide with an external event, e.g. a part passing on a conveyer belt or heating of a part induced by a laser. For these applications, intermittent data acquisition, or acquisition at a continuously variable rate may reduce data storage requirements yet provide a concise summary of the behavior of the target during a particular time interval.

Early video systems were based on visual analysis of images on a display screen, either in real time or during playback from a video tape or video disk. Subsequent improvements allowed analog video data to be digitized by frame grabber cards in a host personal computer. Today, cameras which output digital data directly are gaining popularity, particularly in infrared (IR) imaging. The use of a digital camera allows images to be processed numerically, by the host computer, without the errors due to digitization or loss of dynamic range common to analog frame grabbers. However, the computer memory available for image analysis and storage is finite, so that image sequences which can be routinely processed by a human observer, say, 30 seconds, may not be practical for a personal computer.

In these types of applications where the target phenomena to be imaged varies in time, it is useful to match the rate of data acquisition more closely to the rate at which the phenomena changes. For example, for nondestructive testing applications, where a target is imaged in the IR in order to monitor its surface temperature in response to a transient heating or cooling stimulus (e.g. a laser pulse or electrical current), it would be most desirable to capture data at the highest possible rate during and immediately after the heating event, since significant frame to frame variations are likely to occur during this phase. However, as the cooling rate of the target decreases, it may no longer be necessary to acquire data at the highest acquisition rate, since differences between adjacent frames are likely to be quite small as time passes. Ideally, a camera designed for this type of application would have a continuously variable frame rate. Unfortunately, such devices are considerably more expensive than fixed frame rate cameras. In the IR, the use of a variable frame rate camera to image a target which is either heating or cooling can pose significant technical problems, since the response of the individual detector elements on the camera focal plane array may need to be calibrated for specific integration times and temperature ranges, and the calibration tables may need to be changed in real time, as the frame rate and temperature vary.

In view of the above, an object of this invention is to provide both hardware and software which provides precise control over the timing of digital image data acquisition by a personal computer, and simulates the effect of a variable frame rate camera.

In view of the above, an object of this invention is to provide both hardware and software which simulates the effect of a variable frame rate camera.

SUMMARY OF THE INVENTION

The present invention includes an imaging system for controlling the flow of image data to a host computer including a gate having an input port, an output port and a control path for controlling the passage of electrical signals from the input port to the output port. The imaging system includes a microprocessor which controls the flow of electrical signals through the gate in accordance with a predetermined algorithm. The gate can be comprised of the internal gating structure of the micro controller or it can be comprised of dedicated hardware outside of the micro controller which is controlled by the output control signals of the micro controller.

In a preferred embodiment, the imagining system includes signal conditioning circuitry for changing the voltage levels of the electrical signals delivered to the imaging system and sent from the imaging system to a host computer. In a preferred embodiment the micro controller includes an input port for downloading the control programs from the host computer to the microcomputer.

Preferably, the system is capable of sensing an external event such as a command sent by the host computer or an operator activated switch to initiate the control function of the imaging system.

In a preferred embodiment, the imaging system is capable of generating an output trigger signal to be used by cameras which accept external trigger signals.

In a second embodiment the present invention includes an active thermography imaging system including a means for accepting a series of electrical signals representing sequential portions of an infrared image, means for selecting certain ones of said sequential portions, and means for passing said selected portions to a host computer.

BRIEF DESCRIPTION OF THE DRAWINGS

FIG. 2 illustrates an embodiment of a nondestructive imaging system according to the present invention.

DETAILED DESCRIPTION OF THE PREFERRED EMBODIMENTS

Figure 1:
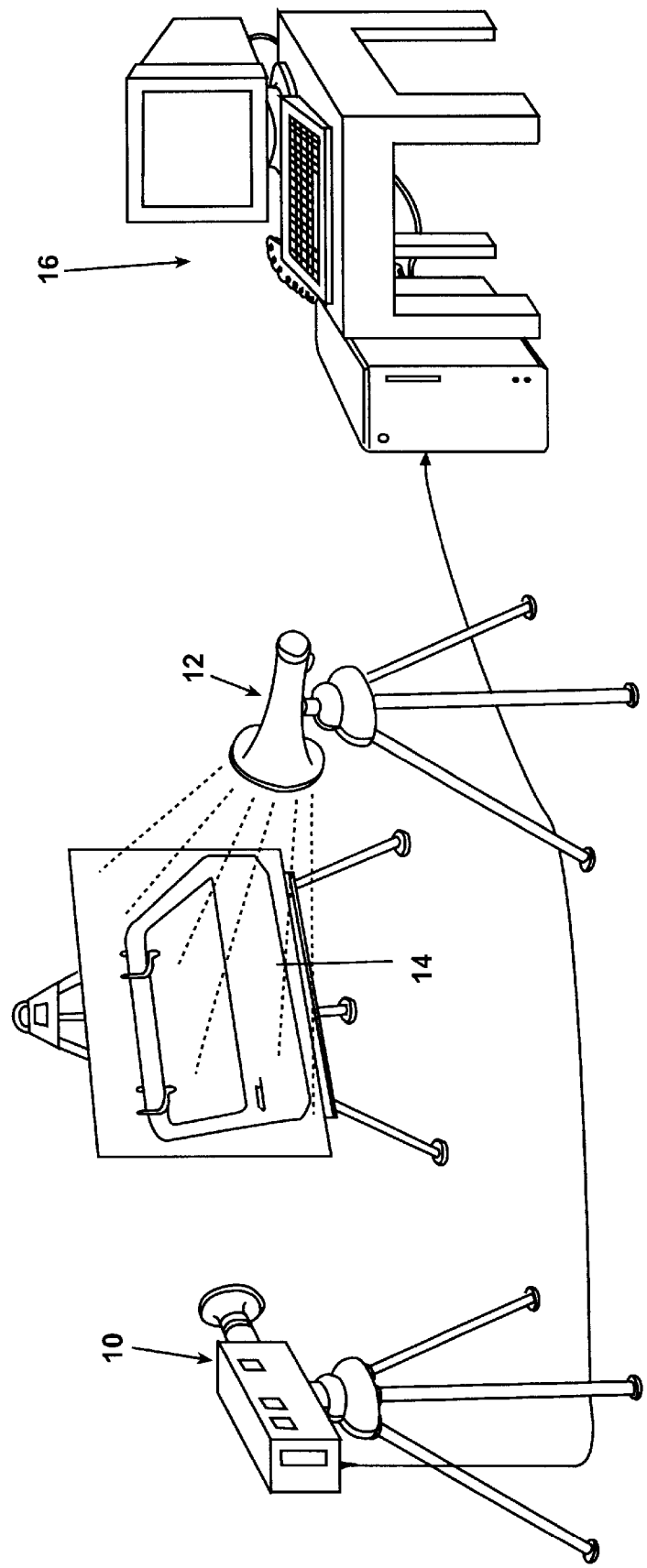
FIG. 1 illustrates a nondestructive imaging system according to the prior art.

Now referring to FIG. 1, prior art nondestructive imaging systems typically include a video imaging camera 10, flash lamp 12 and sample 14. In the traditional approach, flash lamp 12 is turned on for a predetermined time and is pointed in a direction which illuminates target 14 thereby heating its surface. After a predetermined time, flash lamp 12 is turned off and camera 10 captures the infrared image of target 14 as it cools. The image is digitized (typically into RS-422 format) and coupled to a video input card of host system 16. Both visible and infrared cameras frequently output digital image data at frame rates of 60 frames/second or higher. The digital output data is customarily presented in RS-422 format but other formats are sometimes used. Once the data is transferred to host computer 16 it can be analyzed, viewed or stored on the mother board of host 16 through the use of any one of a number of commercially available video digital interface cards. Although most personal computers allow data transfer at sufficiently high speeds so that reasonably sized (256×256 pixels) images can be transferred at the full 60 frames/second data rate, such transfer requires that a large allotment of RAM in host computer 16 for temporary storage of the image data file. In order to store a 256×256 pixel image (i.e. one frame) at a 60 frame/second rate, over 7 megabytes of memory must be allotted for each second of data which is acquired (assuming 2 bytes/pixel). At this frame size, acquisition of 20 seconds of continuous data would exceed the 128 megabyte maximum RAM capability of even some of the most advanced personal computers currently available.

Now referring to FIG. 2, the present invention overcomes the memory shortcomings associated with the prior art approach by using a system which simulates the effect of a variable frame rate camera. The system includes both stand alone electronic hardware and software. The present invention is designed for use in applications where digital data from a fixed rate camera is acquired at a variable frame rate for transfer to a host PC which is equipped with a digital data acquisition card or similar device.

The system of the present invention will now be explained in conjunction with FIG. 2. Camera 10 captures the light 18 (visual spectrum or infrared) which emanates from target 14. As has already been mentioned, light 18 is caused to emanate from target 14 by activating flash lamps 12, 12' at a predetermined energy level which is sufficient to irradiate the surface of target 14. Image data collected by camera 10 is converted into electrical signals (typically in RS-422 data format) and transferred along cable 20 from camera 10 into control circuit 22.

Control circuit 22 is comprised of first and second signal conditioning circuits 24, 28, respectively and micro controller 26. RS-422 data from camera 10 is transferred to first signal conditioning circuit 24 where it is converted into TTL format. This data conversion is necessary because most micro controllers 26 do not directly accept the voltage levels associated with RS-422 format and therefore these voltage levels must be converted to TTL format or whatever format is compatible with the input circuits of micro controller 26. Micro controller 26 monitors the TTL data in real time and performs selective filtering of the TTL data in accordance with control program logic 30 stored within micro controller 26. Micro controller 26 will monitor each frame of data and either pass or block each frame in accordance with the predetermined algorithm embodied in control program logic 30. One such control algorithm would operate to pass frames of image date at a frame rate that is varied in accordance with an exponential decay function. Many other schemes can be used depending on the nature of the rate of change of the phenomena being captured.

Frames which are passed, are sent from digital input port 32 to digital output port 34. At digital output port 34 the data is reconverted from TTL to RS-422 format and passed along cable 36 to the video input card of host computer 16. This pass/block function is indicated functionally by block 38 found within micro controller 26. In the preferred embodiment of the present invention, this gating function is accomplished within micro controller 26 thereby eliminating the need for external hardware gates. However, it is possible to accomplish the gating function of the present invention by way of hardware which is separate from the internal logic control gates of micro controller 26.

Remote Programming

In a preferred embodiment of the present invention, it is contemplated that control program logic 30 is installed within micro controller 26 by way of downloading it from host computer 16. This downloading can be accomplished over bus 40.

Remote Command Inputs and Outputs

Various schemes can be used to remotely initiate the commencement of video acquisition. For example, remote I/O lines 42 can be used to accept a start command from either a manual switch 44 or host PC 16. After a designated period of time has lapsed beyond the receipt of a start signal, micro controller 26 sends a trigger signal along cable 46 to an external heating device such as a flash lamp or a laser. When the system is designed such as this (i.e., a time delay between the initiation signal and the trigger signal), data can be acquired both before and after the heating event.

Micro controller 26 can be programmed to generate an output signal (either digital or analog) to signal to host PC 16 the commencement and completion of each digital frame. This information can be passed from micro controller 26 to host PC 16 by way of bus 40 or any other suitable communication link. Of course, any number of commands can be defined between micro controller 26 and host PC 16 so that "hand shaking" between the two computers can take place. Such communication and hand shaking is well known to those skilled in the computer interface art.

Preferably, any hand shaking which does take place between micro controller 26 and host PC 16 should be defined by a sufficiently complex set of instructions (having error checking) such that false triggering caused by static, electromagnetic pulses, interruption of power and the like will not affect the integrity of the information passed between micro controller 26 and host PC 16.

Remote Gating

An important aspect of the present invention is that control program logic 30 is capable of generating a variable frame rate signal along line 48. Thus, for certain commercially available cameras which are capable of generating output frames in accordance with a variable frame rate signal, control circuit 22 of the present invention can be directly interfaced with such cameras. One such infrared camera is sold under the name of Galileo manufactured by Amber Engineering of Goleta, Calif. and several visible light cameras are available through DALASA of Toronto, Canada.

Dynamic Buffering

Because micro controller 26 incorporates digital memory (not specifically shown), control circuit 22 is capable of providing a means of buffering the data transfer between camera 10 and host PC 16. One simple way of implementing such a function is to program micro controller 26 to act as a shift register which insures that the dynamic range of the data from the camera is matched to the dynamic range of the video acquisition card from within host PC 16.

Complex Heating Patterns

One operational mode which can easily be programmed into micro controller 26 is an operational mode wherein complex heating patterns are generated by lamps 12, 12'. For example, it is fairly easy to generate a signal along control line 46 wherein the intensity of the light emitted from heat lamp 12, 12' is varied in time (such as a sinusoid, ramp, etc.). By using complex heating patterns such as these, image data can be acquired which may unlock clues regarding subsurface defects within target 14 which might not otherwise be evident using traditional lamp control modes.

Multiple Camera Interface

In a preferred embodiment, the images from several cameras 10, 50, 52 and 54 are all processed sequentially by control circuit 22. In this embodiment, the outputs 20, 56, 58 and 60 from cameras 10, 50, 52, and 54 respectively are routed into hardware multiplex switch 62 which is under direct control of micro controller 26 by way of control line 64. The output 66 of multiplex switch 62 is routed to the input of first signal conditioning circuit 24 whereby it is processed in accordance with one or more of the filtering, buffering, etc. schemes which has already been discussed. In the multiple camera embodiment, control line 20 is not routed directly into first signal conditioning circuit 24 but rather is routed into multiplex switch 62 as shown by dotted line 20'.

The primary advantages of the system of the present invention include:

1. It allows targets to be imaged for relatively long time intervals without require excessive amounts of computer RAM.
2. It synchronizes image acquisition with external heating events and allows complex heating patterns (e.g., sinusoidal heating patterns) to be generated.
3. It prevents accidental triggering of external devices by the host computer.
4. Provides control of variable image acquisition rate and external heating events through a single software interface and does not require low level programming of the digital data acquisition card found on the host PC system.

Although the present invention has been described in terms of operation of video frames of data, it can also be programmed to perform the identical pass/block function on subsets (or subportions) of video frames of information such as horizontal lines of video data or even individual pixels of video data.

The foregoing detailed description shows that the preferred embodiments of the present invention are well suited to fulfill the objects of the invention. It is recognized that those skilled in the art may make various modifications or additions to the preferred embodiments chosen here to illustrate the present invention, without departing from the spirit of the present invention. Accordingly, it is to be understood that the subject sought to be afforded protection hereby should be deemed to extend to the subject matter defined in the appended claims, including all fair equivalents thereof.

I claim:

1. An imaging system for controlling the flow of image data to a host computer, comprising:
   a gate having:
      an input port for accepting a first series of electrical signals representing an image, wherein said first series of electrical signals has a first frame rate;
      an output port for coupling said first series of electrical signals to a host computer; and
      a control port for controlling the passage of said electrical signals from said input port to said output port to generate a second series of electrical signals having a second frame rate; and
   means for sending command signals to said control port of said gate to enable said gate to pass said second series of electrical signals from said input port to said output port.

2. The system of claim 1, wherein said means for sending is a micro controller and wherein said micro controller includes control program.

3. The system of claim 2, wherein said micro controller includes an input port for receiving said control program from said host computer.

4. The system of claim 2, further including a first signal conditioning circuit coupled to said input port of said gate for conditioning the electrical signals inputted to said input port.

5. The system of claim 4, further including a second signal conditioning circuit coupled to said output port of said gate for conditioning the electrical signal, outputted from said output port of said gate.

6. The system of claim 2, wherein said control program further includes means for sensing an external event.

7. The system of claim 6, wherein said external event is initiated by said host computer.

8. The system of claim 6, wherein said external event is initiated by a physical event.

9. The system of claim 1, wherein said control program further includes means for outputting a trigger signal.

10. The system of claim 1, wherein said electrical signals represent an infrared image.

11. An active thermography imaging system, comprising:
    means for accepting a first series of electrical signals representing sequential portions of an infrared image, wherein said first series of electrical signals has a first frame rate;
    means for selecting certain signals in said first series of electrical signals representing said infrared images to generate a second series of electrical signals having a second frame rate; and
    means for passing said second series of electrical signals representing said infrared images to a host computer.

12. The system of claim 11, wherein said means for selecting includes a micro controller programmed with an algorithm which commands said micro controller to select certain ones of said electrical signals at a rate proportioned to an exponential decay function.

* * * * *